(12) United States Patent
Kanou et al.

(10) Patent No.: US 11,742,685 B2
(45) Date of Patent: Aug. 29, 2023

(54) CHARGER AND CHARGING METHOD

(71) Applicant: FDK CORPORATION, Tokyo (JP)

(72) Inventors: Takashi Kanou, Tokyo (JP); Kenji Kitamura, Tokyo (JP); Yasunari Mizoguchi, Tokyo (JP); Takeshi Yoshida, Tokyo (JP); Michiko Sato, Tokyo (JP)

(73) Assignee: FDK CORPORATION, Tokyo (JP)

( * ) Notice: Subject to any disclaimer, the term of this patent is extended or adjusted under 35 U.S.C. 154(b) by 290 days.

(21) Appl. No.: 17/309,390

(22) PCT Filed: Sep. 20, 2019

(86) PCT No.: PCT/JP2019/036873
§ 371 (c)(1),
(2) Date: May 24, 2021

(87) PCT Pub. No.: WO2020/115991
PCT Pub. Date: Jun. 11, 2020

(65) Prior Publication Data
US 2022/0029445 A1    Jan. 27, 2022

(30) Foreign Application Priority Data
Dec. 7, 2018   (JP) ................................. 2018-230156

(51) Int. Cl.
*H02J 7/00* (2006.01)
*H01M 10/42* (2006.01)
(Continued)

(52) U.S. Cl.
CPC ..... *H02J 7/007182* (2020.01); *H01M 10/425* (2013.01); *H01M 10/44* (2013.01);
(Continued)

(58) Field of Classification Search
CPC ............. H02J 7/007182; H02J 7/00306; H02J 7/0034; H02J 7/0045; H02J 7/0047; H01M 10/425; H01M 10/44; H01M 10/48
(Continued)

(56) References Cited

U.S. PATENT DOCUMENTS

2010/0283623 A1*  11/2010  Baxter ................... H02J 7/0034
                                                         340/687
2019/0359078 A1*  11/2019  Yamada .................. B60L 58/12

FOREIGN PATENT DOCUMENTS

JP    H0739076  A    2/1995
JP    H07298508 A    11/1995
(Continued)

OTHER PUBLICATIONS

International Search Report and Written Opinion dated Nov. 26, 2019, for corresponding PCT Application No. PCT/JP2019/036873.
(Continued)

*Primary Examiner* — Nathaniel R Pelton
(74) *Attorney, Agent, or Firm* — Kinney & Lange, P.A.

(57) ABSTRACT

This charger 1 is provided with: a battery housing unit 2 including a first contact T1 and a second contact T2 which touch the respective electrode terminals of a battery BAT to be housed therein; a high-potential power supply line 3 and a low-potential power supply line 4 to which power for charging the battery BAT is supplied; a connection switching circuit 5 capable of switching between a first connection state in which the first contact T1 is connected to the high-potential power supply line 3 and the second contact T2 is connected to the low-potential power supply line 4 and a second connection state in which the second contact T2 is connected to the high-potential power supply line 3 and the first contact T1 is connected to the low-potential power supply line 4; and a control device 7 for controlling the (Continued)

connection switching circuit 5 to perform charging control on the battery BAT. The control device 7 performs preliminary charging on the battery BAT in the first connection state and, when a battery voltage VB does not exceed a set voltage VS, switches the connection state to the second connection state and performs preliminary and normal charging on the battery BAT.

8 Claims, 4 Drawing Sheets

(51) Int. Cl.
    *H01M 10/44*    (2006.01)
    *H01M 10/48*    (2006.01)
    *H01M 50/269*   (2021.01)
    *H01M 50/202*   (2021.01)

(52) U.S. Cl.
    CPC ......... *H01M 10/48* (2013.01); *H01M 50/202* (2021.01); *H01M 50/269* (2021.01); *H02J 7/0034* (2013.01); *H02J 7/0045* (2013.01); *H02J 7/0047* (2013.01); *H02J 7/00306* (2020.01); *H01M 2010/4271* (2013.01)

(58) Field of Classification Search
    USPC .......................................................... 320/107
    See application file for complete search history.

(56) References Cited

FOREIGN PATENT DOCUMENTS

| | | |
|---|---|---|
| JP | H08172727 A | 7/1996 |
| JP | H11275771 A | 10/1999 |
| JP | 2002191136 A | 7/2002 |
| JP | 2013005569 A | 1/2013 |
| JP | 2018153034 A | 9/2018 |

OTHER PUBLICATIONS

Extended European Search Report dated Jul. 26, 2022, received for corresponding European Application No. 19893277.4, pp. 7.

\* cited by examiner

CHARGER AND CHARGING METHOD

CROSS-REFERENCE TO RELATED APPLICATION(S)

This application is the national phase of PCT Application No. PCT/JP2019/036873 filed on Sep. 20, 2019, which in turn claims priority to Japanese Application No. 2018-230156 filed on Dec. 7, 2018, both of which are incorporated by reference in their entireties.

BACKGROUND

Technical Field

The present disclosure relates to a charger and a charging method.

Background Art

Chargers are widely used as devices that enable secondary batteries to be repetitively used by charging the secondary batteries. When a battery is mounted in such a charger, it is necessary to check the polarity of the battery. In other words, it is necessary to mount the battery in the charger in a correct connecting direction in which a positive electrode terminal comes into contact with a contact which the positive electrode terminal should contact, and a negative electrode terminal comes into contact with a contact which the negative electrode terminal should contact.

Although chargers are often configured so as to prevent connection when the connecting direction is opposite, batteries may be mounted in an opposite direction to a correct connecting direction. When the batteries are mounted in the connecting direction opposite to the correct connecting direction in the charger, not only the batteries cannot be charged, but also the batteries may leak or the like, for example.

As an example of a conventional technique which has an object to solve such a problem, for example, Patent Document 1 discloses a charger in which the connecting direction of a battery is determined by a pair of photocouplers for detecting the presence or absence of current flowing from a positive electrode terminal and a negative electrode terminal of the battery, respectively. Further, for example, Patent Document 2 discloses a charger which includes a pair of operational amplifiers for comparing the voltages of a positive electrode terminal and a negative electrode terminal of a battery, and determines the connecting direction of the battery based on the relationship in magnitude between the output voltages of the pair of operational amplifiers.

PRIOR ART DOCUMENT

Patent Document

Patent Document 1: Japanese Patent Laid-Open No. 7-39076

Patent Document 2: Japanese Patent Laid-Open No. 2018-153034

SUMMARY

Normal battery voltage ranges are defined for secondary batteries, and it is known that deterioration of a battery is promoted, for example, in a so-called over-discharged state in which the voltage of the battery falls below a discharge end voltage. Further, in the case of secondary batteries, for example, when a plurality of batteries having different battery capacities are connected in series and excessively discharged, a polarity inversion phenomenon in which the potential of a negative electrode terminal becomes higher than the potential of a positive electrode terminal may occur in a battery having a small battery capacity. It is known that a secondary battery in which the polarity inversion phenomenon has occurred can be restored to a normal polarity, for example, by pre-charging at a low charging rate. Therefore, the secondary battery in which the polarity inversion phenomenon has occurred is normally charged after the polarity is restored by a charger having a pre-charging function.

However, with respect to the conventional charger having the polarity determination function described above, since the direction of charging power to be supplied to a secondary battery is switched by comparing the potentials of the respective electrode terminals of the secondary battery, there is a case where an erroneous polarity determination is made for a secondary battery in which polarity inversion has occurred, and the secondary battery cannot be charged properly.

The present disclosure has been made in view of such a situation, and has an object to provide a charger and a charging method that can charge even a secondary battery in which polarity inversion has occurred while performing polarity determination.

In order to achieve the above object, a charger according to the present disclosure comprises: a battery accommodating unit including a first contact and a second contact to be respectively in contact with electrode terminals of a battery accommodated therein; a high-potential power supply line and a low-potential power supply line to which power for charging the battery is supplied; a connection switching circuit capable of switching between a first connection state in which the first contact is connected to the high-potential power supply line and the second contact is connected to the low-potential power supply line and a second connection state in which the second contact is connected to the high-potential power supply line and the first contact is connected to the low-potential power supply line; and a control device for controlling the connection switching circuit to acquire a battery voltage of the battery and perform charging control on the battery, wherein the control device performs pre-charging on the battery in the first connection state, and when the battery voltage does not exceed a predetermined set voltage, the control device switches the first connection state to the second connection state and performs the pre-charging on the battery, but when the battery voltage exceeds the set voltage, the control device performs normal charging on the battery.

According to the present disclosure, there can be provided a charger and a charging method that can charge even a secondary battery in which polarity inversion has occurred while performing polarity determination.

DETAILED DESCRIPTION

Hereinafter, embodiments of the present disclosure will be described in detail with reference to the drawings. The present disclosure is not limited to the contents described below, and can be arbitrarily modified and implemented without changing the gist thereof. Further, the drawings used for describing the embodiments are all schematically showing the constituent elements, are partially emphasized, enlarged, reduced, or omitted in order to deepen the understanding of the constituent elements, and may not accurately represent the scales, shapes, etc., of the constituent elements.

First Embodiment

Figure 1:
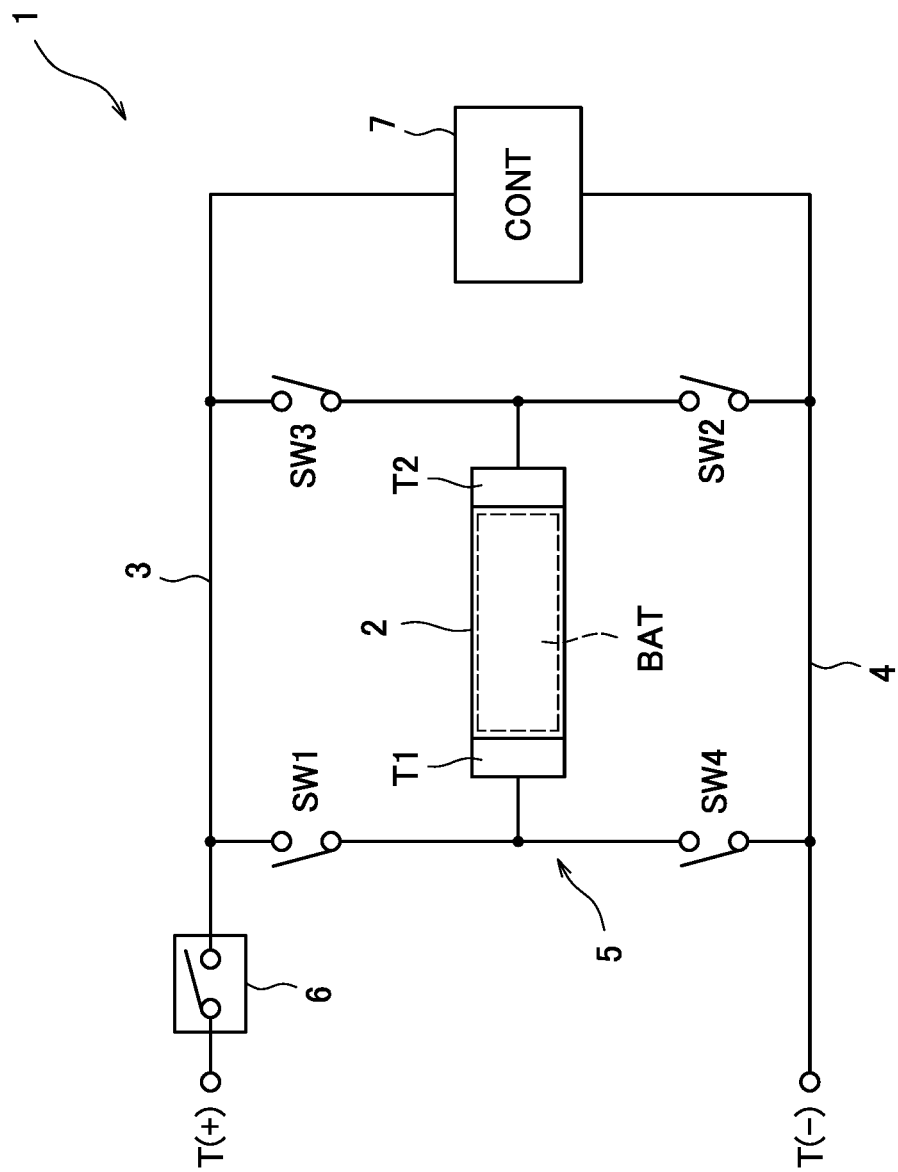
FIG. 1 is a circuit diagram of a charger according to the present disclosure.

FIG. 1 is a circuit diagram of a charger 1 according to the present disclosure. The charger 1 of the present embodiment includes a battery accommodating unit 2, a high-potential power supply line 3, a low-potential power supply line 4, a connection switching circuit 5, a charging switch 6, a control device 7, and a power supply input terminal T. Upon supply of power from the outside of the charger 1 between the two power supply input terminals T(+) and T(−), the charger 1 determines the polarity of a battery BAT accommodated in the battery accommodating unit 2, that is, the connection direction of the battery BAT, thereby charging the battery BAT in an appropriate connecting direction.

The battery accommodating unit 2 includes a first contact T1 and a second contact T2 to be respectively in contact with the electrode terminals of the battery BAT accommodated therein. In other words, when the battery BAT is accommodated in the battery accommodating unit 2 while the positive electrode terminal is in contact with the first contact T1, the negative electrode terminal is in contact with the second contact T2, and when the battery BAT is accommodated in the battery accommodating unit 2 while the negative electrode terminal is in contact with the first contact T1, the positive electrode terminal is in contact with the second contact T2.

Here, the battery BAT is assumed to be a nickel-metal hydride secondary battery having a nominal voltage of 1.2 [V] in the present embodiment. Further, it is assumed that the battery BAT of the present embodiment has a discharge end voltage of 1.0 [V] and a charge end voltage of 1.3 [V], and normal charging/discharging is performed in this voltage range.

The high-potential power supply line 3 and the low-potential power supply line 4 are connected to the two power supply input terminals T(+) and T(−) respectively to supply power for charging the battery BAT between both the power supply input terminals, and also supply power supply power to operate the control device 7.

The connection switching circuit 5 is a circuit for switching the connection state of the battery accommodating unit 2 in which the battery BAT is accommodated between the high-potential power supply line 3 and the low-potential power supply line 4. More specifically, the connection switching circuit 5 includes, for example, a first switch SW1, a second switch SW2, a third switch SW3, and a fourth switch SW4 each of which includes a field effect transistor (FET). One end of the first switch SW1 is connected to the first contact T1, and the other end of the first switch SW1 is connected to the high-potential power supply line 3. One end of the second switch SW2 is connected to the second contact T2, and the other end of the second switch SW2 is connected to the low-potential power supply line 4. One end of the third switch SW3 is connected to the second contact T2, and the other end of the third switch SW3 is connected to the high-potential power supply line 3. One end of the fourth switch SW4 is connected to the first contact T1, and the other end of the fourth switch SW4 is connected to the low-potential power supply line 4.

As a result, the connection switching circuit 5 can switch between, for example, a first connection state in which the first contact T1 is connected to the high-potential power supply line 3 and the second contact T2 is connected to the low-potential power supply line 4, and a second connection state in which the second contact T2 is connected to the high-potential power supply line 3 and the first contact T1 is connected to the low-potential power supply line 4. Note that each switch of the connection switching circuit 5 is controlled to be connected/disconnected by the control device 7.

In the present embodiment, the charging switch 6 includes, for example, a field effect transistor, and is provided between the power supply input terminal T(+) and the high-potential power supply line 3. As described later, the charging switch 6 controls the charging power to the battery BAT by performing disconnection/connection control of power to be supplied from the outside of the charger 1 based on the control by the control device 7. Note that voltage conversion of charging power may be performed by using a DC-DC converter instead of the charging switch 6.

The control device 7 includes, for example, a well-known microcomputer control circuit, and integrative controls the entire charger 1, which includes polarity determination of the battery BAT and charging control of the battery BAT as described in detail later. Further, the control device 7 of the present embodiment includes a built-in AD converter (not shown) that converts an analog voltage on the circuit into a digital voltage and reads in the digital voltage. The control device 7 receives the voltages of the high-potential power supply line 3 and the low-potential power supply line 4 through the built-in AD converter, respectively. Note that a resistance circuit may be appropriately provided on an electrically conductive path between the control device 7 and the high-potential power supply line 3 so that a voltage exceeding a specified absolute maximum rating is not input to the control device 7.

Figure 2:
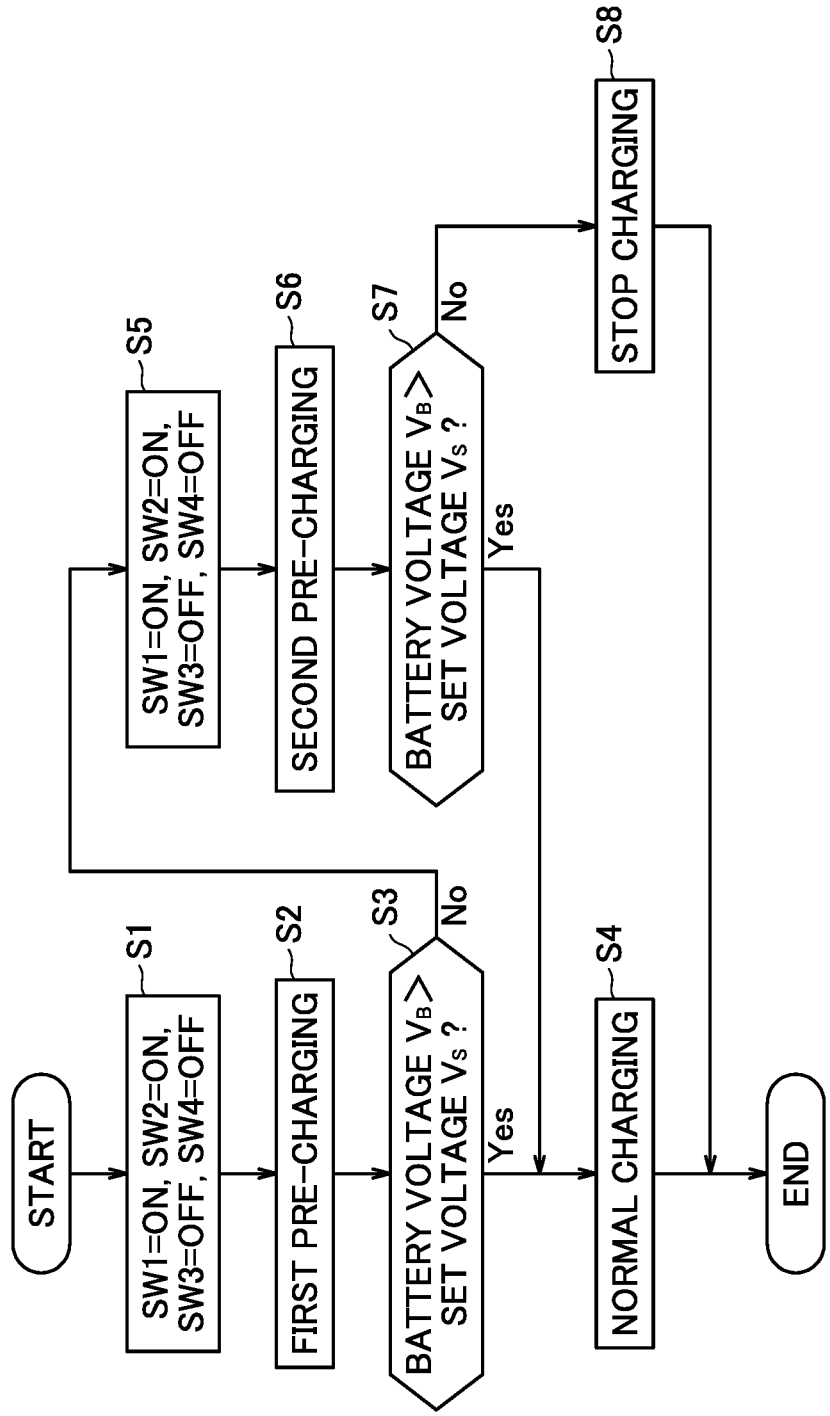
FIG. 2 is a flowchart showing a charging method according to a first embodiment of the present disclosure.

Next, an example of a control procedure of the control device 7 for determining the polarity of the battery BAT accommodated in the battery accommodating unit 2 and charging the battery BAT will be described. FIG. 2 is a flowchart showing a charging method according to the first embodiment of the present disclosure. The control device 7 starts the control of FIG. 2 in a state where the battery BAT is accommodated in the battery accommodating unit 2. Note that at the start of the control, it is assumed that each switch of the connection switching circuit 5 and the charging switch 6 are all set to OFF.

When the control operation is started, the control device 7 controls the first switch SW1 and the second switch SW2 to be set to ON, and controls the third switch SW3 and the fourth switch SW4 to be set to OFF (step S1, first connection step). As a result, the battery accommodating unit 2 is set to the foregoing first connection state in which the first contact T1 is connected to the high-potential power supply line 3 and the second contact T2 is connected to the low-potential power supply line 4.

Further, the control device 7 assumes that the battery BAT has been accommodated in the battery accommodating unit 2 in a direction in which the positive electrode terminal of the battery BAT comes into contact with the first contact T1, and performs pre-charging on the battery BAT in a state where the connection switching circuit 5 is controlled to the first connection state (step S2, first pre-charging step). More specifically, the control device 7 controls the charging switch 6 to charge the battery BAT at a low charging rate for a predetermined time via the connection switching circuit 5, thereby determining whether it is possible to charge the battery BAT. Here, in the pre-charging, even when the positive electrode terminal of the battery BAT is accommodated in the battery accommodating unit 2 in the direction in which the positive electrode terminal of the battery BAT is in contact with the second contact T2, or when the battery BAT breaks down, a charging power which is low to the extent that safety is sufficient is supplied to the battery BAT.

As a result, the control device 7 checks whether the battery BAT accommodated in the battery accommodating unit 2 is a secondary battery and whether the battery accommodating unit 2 has broken down due to deterioration or the like. At this time, when polarity inversion has occurred in the battery BAT although the battery BAT is accommodated in the battery accommodating unit 2 in the direction in which the positive electrode terminal is in contact with the first contact T1, the polarity inversion is restored by performing pre-charging for a predetermined time, so that the battery BAT returns to a chargeable state. In other words, the duration of pre-charging is preset as a time in which the polarity inversion has been restored even when the polarity inversion is occurring in the battery BAT.

When the pre-charging in the first connection state is completed, the control device 7 compares the battery voltage $V_B$ of the battery BAT acquired via the connection switching circuit 5 and the high-potential power supply line 3 with a predetermined set voltage $V_S$ to determine whether the battery BAT is accommodated in the battery accommodating unit 2 in the direction in which the positive electrode terminal of the battery BAT is in contact with the first contact T1 (step S3). Here, the predetermined set voltage $V_S$ is a threshold value which is preset to determine whether the battery voltage $V_B$ of the battery BAT is within a voltage range in which normal charging/discharging is performed.

When the battery BAT has been accommodated in the battery accommodating unit 2 in a direction in which the positive electrode terminal of the battery BAT comes into contact with the first contact T1, a positive voltage is output between the high-potential power supply line 3 and the low-potential power supply line 4 by the battery voltage $V_B$ of the battery BAT connected in the forward direction under the first connection state unless no polarity inversion has occurred in the battery BAT. Further, when the battery BAT has been accommodated in the battery accommodating unit 2 in a direction in which the positive electrode terminal of the battery BAT comes into contact with the second contact T2, a negative voltage is output between the high-potential power supply line 3 and the low-potential power supply line 4 by the battery voltage $V_B$ of the battery BAT connected in the reverse direction under the first connection state unless no polarity inversion has occurred in the battery BAT.

Therefore, the control device 7 can determine whether the battery BAT is accommodated in the battery accommodating unit 2 in the state where the positive electrode terminal is in contact with the first contact T1 by reading the voltage between the high-potential power supply line 3 and the low-potential power supply line 4 in the state where the connection switching circuit 5 is controlled to be set to the first connection state.

When it is determined that the battery voltage $V_B$ exceeds the set voltage $V_S$ (Yes in step S3), the control device 7 performs normal charging on the battery BAT on the assumption that the battery BAT is in a chargeable state (step S4, normal charging step). In the normal charging, the charging rate does not matter.

As a result, when the battery BAT has reached a fully charged state, the control device 7 causes the charging switch 6 to stop supply of the charging current, and controls each switch of the connection switching circuit 5 to be set to OFF, thereby terminating the charging of the battery BAT and completing a series of control procedures. At this time, the control device 7 may notify the user of the normal end of charging.

On the other hand, when it is determined that the battery voltage $V_B$ has not exceeded the set voltage $V_S$ (No in step S3), the control device 7 switches the first switch SW1 and the second switch SW2 to OFF, and switches the third switch SW3 and the fourth switch SW4 to ON (step S5, second connection step). As a result, the battery accommodating unit 2 is set to the above-mentioned second connection state in which the second contact T2 is connected to the high-potential power supply line 3 and the first contact T1 is connected to the low-potential power supply line 4.

Further, the control device 7 assumes that the battery BAT has been accommodated in the battery accommodating unit 2 in a direction in which the positive electrode terminal of the battery BAT comes into contact with the second contact T2, and performs pre-charging on the battery BAT in a state where the connection switching circuit 5 is controlled to the second connection state (step S6, second pre-charging step).

As a result, the control device 7 checks whether the battery BAT accommodated in the battery accommodating unit 2 is a secondary battery and whether the battery accommodating unit 2 has broken down due to deterioration or the like. At this time, when polarity inversion has occurred in the battery BAT although the battery BAT has been accommodated in the battery accommodating unit 2 in the direction in which the positive electrode terminal comes into contact with the second contact T2, the polarity inversion is restored by performing pre-charging for a predetermined time, and the battery BAT returns to a chargeable state.

When the pre-charging in the second connection state is completed, the control device 7 compares the battery voltage $V_B$ of the battery BAT with the set voltage $V_S$ to determine whether the battery BAT has been accommodated in the battery accommodating unit 2 in the direction in which the positive electrode terminal of the battery BAT comes into contact with the second contact T2 (step S7).

When it is determined that the battery voltage $V_B$ exceeds the set voltage $V_S$ (Yes in step S7), the control device 7 performs normal charging on the battery BAT on the assumption that the battery BAT is in a chargeable state in the second connection state (step S4, normal charging step).

When the battery voltage $V_B$ of the battery BAT which has been subjected to pre-charging does not exceed the set voltage $V_S$ in both the first connection state and the second connection state (No in step S7), the control device 7 stops charging of the battery BAT on the assumption that the battery BAT has broken down. In other words, the control device 7 stops the supply of charging power by the charging switch 6, and controls each switch of the connection switching circuit 5 to be set to OFF, thereby terminating the charging of the battery BAT and completing a series of control procedures. At this time, the control device 7 may notify the user of the abnormal end of charging.

As described above, the control device 7 can perform normal charging on the battery BAT in an appropriate direction by switching to the first connection state or the second connection state so that the battery BAT is set to a chargeable state by pre-charging.

Figure 3:
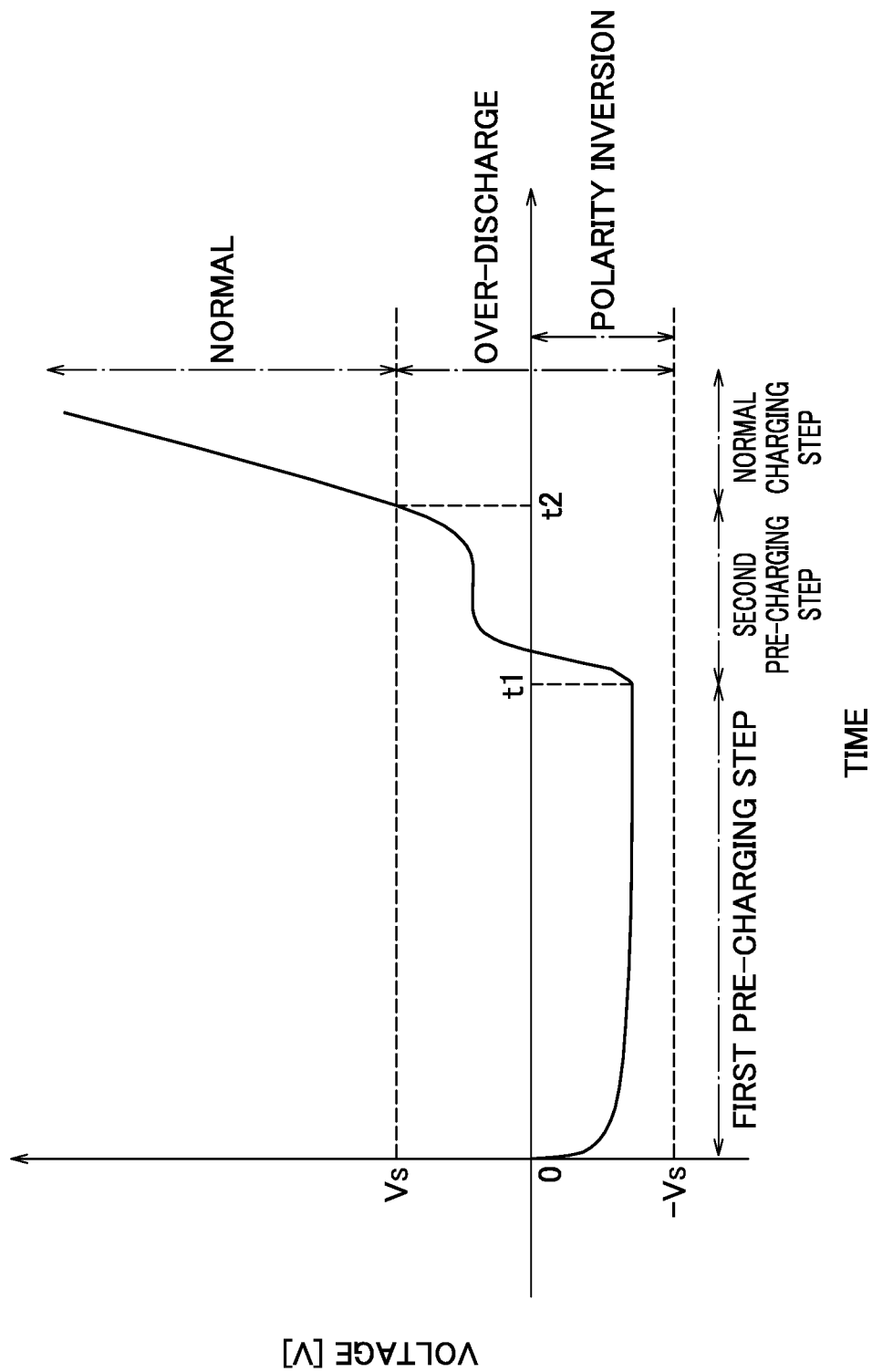
FIG. 3 is a diagram showing an example of a change in battery voltage when a polarity-inverted battery is charged.

Here, the control of charging in the case where polarity inversion has occurred in the battery BAT at the start of charging will be described together with an aspect of a change in the battery voltage $V_B$. FIG. 3 is a diagram showing an example of a change in the battery voltage $V_B$ when the polarity-inverted battery BAT is charged. The vertical axis of FIG. 3 represents the absolute potential of the positive electrode terminal with respect to the negative electrode terminal of the battery BAT, and shows a negative voltage in the polarity-inverted state. However, the value of a voltage read by the control device 7 is inverted in sign according to the connection state of the connection switching circuit 5. Further, it is hereinafter assumed that the battery BAT is accommodated in the battery accommodating unit 2 in the direction in which the positive electrode terminal comes into contact with the second contact T2 under a polarity-inverted state.

At the start of charging the battery BAT in the present embodiment, the control device 7 first controls the connection switching circuit 5 to be set to the first connection state, and then starts pre-charging. At this time, although the battery BAT is accommodated in the battery accommodating unit 2 in the direction in which the positive electrode terminal comes into contact with the second contact T2, the voltage of the negative electrode terminal is higher than that of the positive electrode terminal due to polarity inversion. Therefore, in the state where the connection switching circuit 5 is controlled to set to the first connection state, the control device 7 receives a positive voltage via the high-potential power supply line 3. In other words, when the battery BAT is in the over-discharged state, the control device 7 cannot identify the state where the absolute battery voltage $V_B$ of the battery BAT is positive and the state where the absolute battery voltage $V_B$ of the battery BAT is negative and there is polarity inversion phenomenon.

Therefore, in the present embodiment, the control device 7 assumes that the battery BAT is accommodated in the battery accommodating unit 2 in the direction in which the positive electrode terminal of the battery BAT comes into contact with the first contact T1, and performs pre-charging for only a predetermined time. Then, if the battery voltage $V_B$ does not exceed the set voltage $V_S$, the control device 7 switches the first connection state to the second connection state (timing t1 in FIG. 3).

Further, when the battery BAT is in the polarity-inverted state, the control device 7 restores the polarity inversion by performing pre-charging for only a predetermined time in the second connection state. Then, when the battery voltage $V_B$ exceeds the set voltage $V_S$ at a timing t2 when a predetermined time has elapsed from the timing t1, the control device 7 starts normal charging on the battery BAT in the second connection state (timing t2 of FIG. 3).

As described above, when the battery voltage $V_B$ of the battery BAT which has been subjected to pre-charging in the first connection state does not exceed the set voltage $V_S$, the charger 1 according to the first embodiment of the present disclosure switches the first connection state to the second connection state and performs pre-charging. However, when the battery voltage $V_B$ of the battery BAT exceeds the set voltage $V_S$, the charger 1 performs normal charging on the battery BAT. As a result, according to the charger 1 of the first embodiment of the present disclosure, even in the case where polarity inversion has occurred in a battery BAT before charging, the connection state of the connection switching circuit 5 is switched when the battery voltage $V_B$ of the battery BAT does not exceed a chargeable voltage, so that even a secondary battery in which polarity inversion has occurred can be charged while performing polarity determination.

Second Embodiment

Next, a second embodiment of the present disclosure will be described. A charger 1 according to the second embodiment has a common circuit configuration and a different control procedure with respect to the charger 1 of the first embodiment. Portions which are different from those of the first embodiment will be described, common components to the first embodiment are designated by the same reference signs, and detailed description thereof will be omitted.

Figure 4:
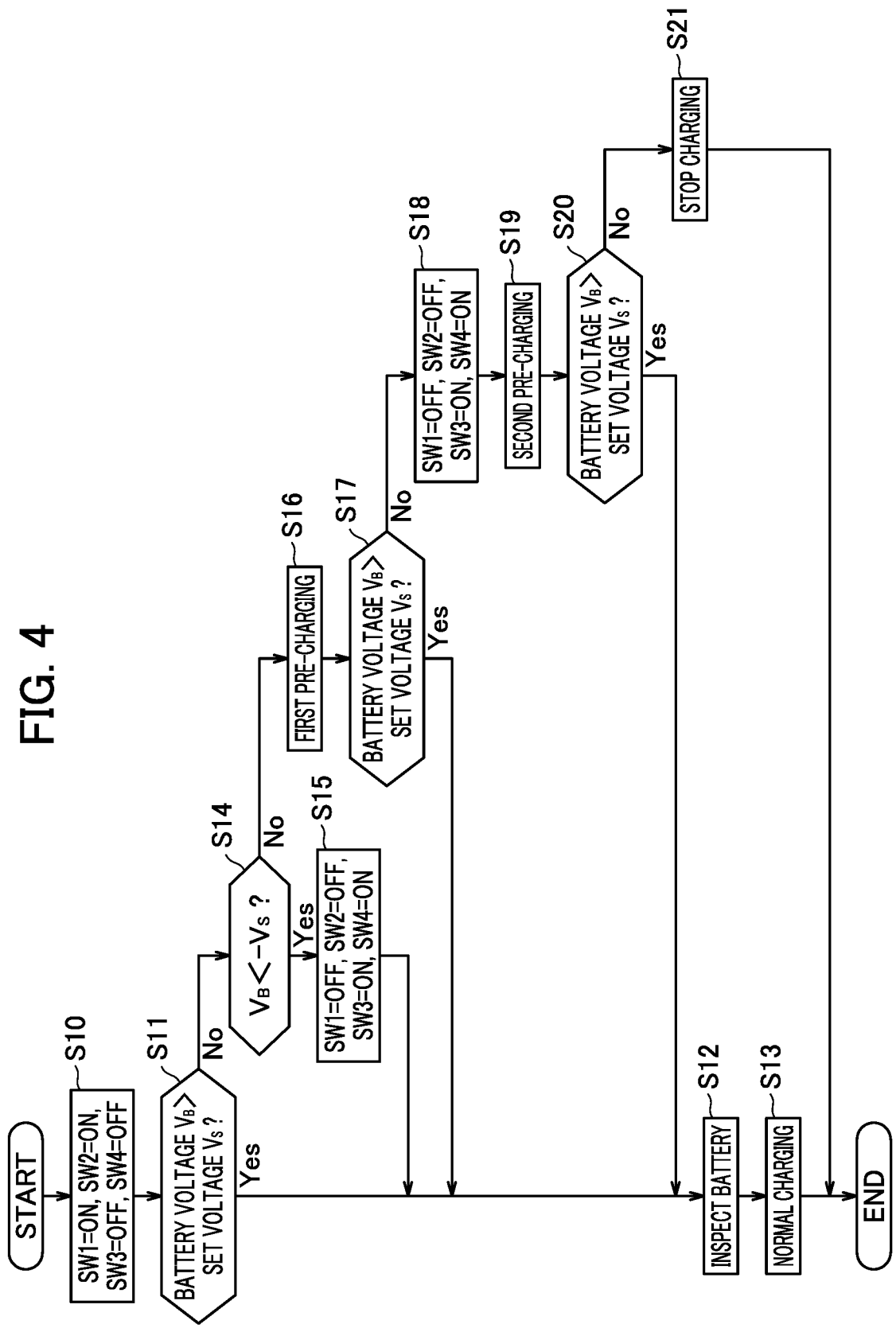
FIG. 4 is a flowchart showing a charging method according to a second embodiment of the present disclosure.

FIG. 4 is a flowchart showing a charging method according to the second embodiment of the present disclosure. The control device 7 starts the control of FIG. 4 in a state where the battery BAT is accommodated in the battery accommodating unit 2. Here, it is assumed that at the start of control, each switch of the connection switching circuit 5 and the charging switch 6 are all set to OFF.

When the control operation is started, the control device 7 controls the first switch SW1 and the second switch SW2 to be set to ON, and controls the third switch SW3 and the fourth switch SW4 to be set to OFF (step S10, first connection step). As a result, the battery accommodating unit 2 is set to the above-mentioned first connection state in which the first contact T1 is connected to the high-potential power supply line 3 and the second contact T2 is connected to the low-potential power supply line 4.

By determining whether the battery voltage $V_B$ of the battery BAT exceeds the set voltage $V_S$, the control device 7 determines whether the battery BAT is accommodated in the battery accommodating unit 2 in the direction in which the positive electrode terminal of the battery BAT comes into contact with the first contact T1, and additionally determines whether the battery BAT is in the over-discharged state (step S11).

When the battery voltage $V_B$ exceeds the set voltage $V_S$ (Yes in step S11), the control device 7 omits pre-charging on the battery BAT on the assumption that the battery BAT is accommodated in the battery accommodating unit 2 in the direction in which the positive electrode terminal of the battery BAT comes into contact with the first contact T1 because the battery voltage $V_B$ is positive in the first connection state, and additionally, that the battery BAT is not in the over-discharged state. Further, the control device 7 performs only a battery inspection for confirming that the battery BAT accommodated in the battery accommodating unit 2 is not a primary battery (step S12), and performs normal charging on the battery BAT (step S13, normal charging step). Here, when it is not necessary to consider the possibility that a primary battery is accommodated in the battery accommodating unit 2, the battery inspection may be omitted.

When the battery voltage $V_B$ does not exceed the set voltage $V_S$ (No in step S11), the control device 7 determines whether the battery voltage $V_B$ is lower than the set voltage $V_S$ whose sign is inverted (step S14).

When the battery voltage $V_B$ is lower than the set voltage $V_S$ whose sign is inverted (Yes in step S14), the control device 7 omits the pre-charging on the battery BAT on the assumption that the battery BAT is accommodated in the battery accommodating unit 2 in the direction in which the positive electrode terminal of the battery BAT comes into contact with the second contact T2 because the battery voltage $V_B$ is negative in the first connection state, and additionally, that the battery BAT is not in the over-discharged state.

Therefore, the control device 7 switches the connection switching circuit 5 from the first connection state to the second connection state (step S15), and performs normal charging on the battery BAT (step S13, normal charging step) after the battery inspection (step S12) is performed in the same manner as described above.

In other words, when the absolute value of the battery voltage $V_B$ has already exceeded the set voltage $V_S$ before pre-charging on the battery BAT is started, the control device 7 performs normal charging without performing pre-charging. As a result, based on the state of the connection switching circuit 5 and the read-in value of the battery voltage $V_B$, the control device 7 can confirm whether polarity inversion has occurred in the battery BAT at the start of charging, so that it is possible to omit pre-charging purposing to restore polarity inversion when no polarity inversion is confirmed, and thus shorten the charging time.

On the other hand, when the battery voltage $V_B$ is not lower than the set voltage $V_S$ whose sign is inverted (No in step S14), on the assumption that the battery BAT is in the polarity-inverted state or the over-discharged state, as in the case of the first embodiment, when the battery voltage $V_B$ of the battery BAT which has been subjected to pre-charging in the first connection state does not exceed the set voltage $V_S$, the control device 7 switches the first connection state to the second connection state and performs pre-charging, but when the battery voltage $V_B$ of the battery BAT exceeds the set voltage $V_S$, the control device 7 performs normal charging on the battery BAT. Here, since the procedure from step S16 to step S21 of the present embodiment in FIG. 4 is the same as the procedure from step S2 to step S3 and step S5 to step S8 of the first embodiment in FIG. 2, a detailed description thereof will be omitted.

As described above, since the charger 1 according to the second embodiment of the present disclosure can determine that the battery BAT is not in the polarity-inverted state or the over-discharged state in the case where the absolute value of the battery voltage $V_B$ has already exceeded the set voltage $V_S$ at the start of charging control, it is possible to perform normal charging without performing pre-charging by determining the polarity of the battery BAT based on the sign of the battery voltage $V_B$ acquired by the control device 7. As a result, according to the charger 1 of the second embodiment of the present disclosure, unnecessary pre-charging is not performed, so that the time required from the start to the end of the charging control can be shortened.

The description of the embodiments is completed above, however, the present invention is not limited to each of the embodiments described above. For example, in each of the embodiments described above, when the battery voltage $V_B$ exceeds the set voltage $V_S$ after pre-charging is performed for a predetermined time, it is determined that the battery BAT becomes chargeable. However, when the battery voltage $V_B$ exceeds the set voltage $V_S$ during a period of time from the start of pre-charging until elapse of a predetermined time, normal charging may be started at that time point. As a result, the charger 1 can shorten the time required for the pre-charging according to the degree of over-discharging of the battery BAT.

Further, in each of the embodiments described above, it is determined that the voltage of the battery BAT is in a chargeable normal range based on the battery voltage $V_B$ exceeding the set voltage $V_S$. However, it may be used as a condition for determination that the battery voltage $V_B$ is within a range from the set voltage $V_S$ to the charge end voltage. As a result, the control device 7 can perform abnormality determination even when the battery voltage $V_B$ of the battery BAT is higher than expected.

<Aspects of the Present Disclosure>

A first aspect of the present disclosure is a charger comprising: a battery accommodating unit including a first contact and a second contact to be respectively in contact with electrode terminals of a battery accommodated therein; a high-potential power supply line and a low-potential power supply line to which power for charging the battery is supplied; a connection switching circuit capable of switching between a first connection state in which the first contact is connected to the high-potential power supply line and the second contact is connected to the low-potential power supply line and a second connection state in which the second contact is connected to the high-potential power supply line and the first contact is connected to the low-potential power supply line; and a control device for controlling the connection switching circuit to acquire a battery voltage of the battery and perform charging control on the battery, wherein the control device performs pre-charging on the battery in the first connection state, and when the battery voltage does not exceed a predetermined set voltage, the control device switches the first connection state to the second connection state and performs pre-charging on the battery, but when the battery voltage exceeds the set voltage, the control device performs normal charging on the battery.

The charger is configured to be capable of switching, via the connection switching circuit, a supply direction of charging power to the battery accommodating unit in which the battery is accommodated, and performs charging control while determining the polarity of the battery based on the battery voltage. When the battery voltage of the battery which has been subjected to pre-charging in the first connection state does not exceed a predetermined set voltage, the charger switches the first connection state to the second connection state and performs pre-charging, but when the battery voltage exceeds the set voltage, the charger performs normal charging.

As a result, according to the charger of the first aspect of the present disclosure, even in the case where polarity inversion has occurred in the battery before charging, the connection state of the connection switching circuit is switched when the battery voltage of the battery does not exceed a chargeable voltage. Therefore, even a secondary battery in which polarity inversion has occurred can be charged while polarity determination is performed.

A second aspect of the present disclosure is a charger in which the control device stops charging when the battery voltage of the battery which has been subjected to the pre-charging does not exceed the set voltage in both the first connection state and the second connection state in the first aspect of the present disclosure described above.

According to the charger of the second aspect of the present disclosure, when the battery voltage does not exceed the set voltage due to the pre-charging in both the first connection state and the second connection state, it can be determined that it is impossible to charge and restore the battery, so that charging can be stopped and safety can be ensured.

A third aspect of the present disclosure is a charger in which the control device starts the normal charging when the battery voltage exceeds the set voltage in a period of time from the start of the pre-charging until elapse of a predetermined time in the first or second aspect of the present disclosure described above.

The charger of the third aspect of the present disclosure does not determine that the battery becomes chargeable when the battery voltage exceeds the set voltage after the pre-charging is performed for a predetermined time, but when the battery voltage exceeds the set voltage in a period of time from start of the pre-charging until elapse of a predetermined time, the charger starts the normal charging at that time point. As a result, according to the charger of the third aspect of the present disclosure, the time required for the pre-charging can be shortened according to the degree of over-discharge of the battery.

A fourth aspect of the present disclosure is a charger in which the control device performs the normal charging without performing the pre-charging when the absolute value of the battery voltage has already exceeded the set voltage before the pre-charging is started in any one of the first to third aspects of the present disclosure described above.

When the absolute value of the battery voltage has already exceeded the set voltage at the start of charging control, the charger according to the fourth aspect of the present disclosure can determine that the battery is not in the polarity-inverted state or the over-discharged state. Therefore, by determining the polarity of the battery based on the sign of the battery voltage acquired by the control device, the normal charging can be performed without performing the pre-charging. As a result, according to the charger of the fourth aspect of the present disclosure, unnecessary pre-charging is not performed, so that the time required from the start to the end of the charging control can be shortened.

A fifth aspect of the present disclosure is a charging method comprising: a first connecting step of controlling to a first connection state in which a first contact out of the first contact and a second contact to be in contact with electrode terminals of a battery respectively is connected to a high-potential power supply line and the second contact is connected to a low-potential power supply line; a first pre-charging step of performing pre-charging on the battery in the first connection state; a second connecting step of switching the first connection state to a second connection state in which the second contact is connected to the high-potential power supply line and the first contact is connected to the low-potential power supply line when a battery voltage of the battery does not exceed a predetermined set voltage in the first pre-charging step; a second pre-charging step of performing the pre-charging in the second connection state; and a normal charging step of performing normal charging on the battery when the battery voltage exceeds the set voltage in the pre-charging.

The charging method according to the fifth aspect of the present disclosure determines polarity of the battery based on the battery voltage after the pre-charging is performed, switches a direction in which charging power is supplied to a battery accommodating unit in which the battery is accommodated, and performs charging control. When the battery voltage of the battery which has been subjected to the pre-charging in the first connection state does not exceed a predetermined set voltage, the first connection state is switched to the second connection state, and the pre-charging is performed. When the battery voltage exceeds the set voltage, the normal charging is performed.

As a result, according to the charging method of the fifth aspect of the present disclosure, even in the case where polarity inversion has occurred in the battery before the battery is charged, the connection state of the battery accommodating unit is switched when the battery voltage does not exceed a chargeable voltage, so that it is possible to charge even a polarity-inverted secondary battery while performing polarity determination.

A sixth aspect of the present disclosure is a charging method in which charging is stopped when the battery voltage of the battery which has been subjected to the pre-charging does not exceed the set voltage in both the first connection state and the second connection state in the fifth aspect of the present disclosure described above.

According to the charging method of the sixth aspect of the present disclosure, when the battery voltage does not exceed the set voltage due to the pre-charging in both the first connection state and the second connection state, it can be determined that it is impossible to charge and restore the battery, so that charging can be stopped and safety can be ensured.

A seventh aspect of the present disclosure is a charging method in which the normal charging is started when the battery voltage exceeds the set voltage in a period of time from start of the pre-charging until elapse of a predetermined time in the fifth or sixth aspect of the present disclosure described above.

A charging method according to the seventh aspect of the present disclosure does not determine that the battery becomes chargeable when the battery voltage exceeds the set voltage after performing the pre-charging for a predetermined time, but when the battery voltage exceeds the set voltage in the period of time from the start of the pre-charging until the elapse of a predetermined time, the charging method starts the normal charging at that time point. As a result, according to the charging method of the seventh aspect of the present disclosure, the time required for the pre-charging can be shortened according to the degree of over-discharging of the battery.

An eighth aspect of the present disclosure is a charging method in which the normal charging is performed without performing the pre-charging when the absolute value of the battery voltage has already exceeded the set voltage before the pre-charging is started in any one of the fifth to seventh aspects of the present disclosure described above.

According to the charging method of the eighth aspect of the present disclosure, when the absolute value of the battery voltage has already exceeded the set voltage at the start of charging control, it can be determined that the battery is not in the polarity-inverted state or the over-discharged state. Therefore, it is possible to perform the normal charging without performing the pre-charging by determining the polarity of the battery based on the sign of the battery voltage. As a result, according to the charging method of the eighth aspect of the present disclosure, unnecessary pre-charging is not performed, so that the time required from the start to the end of the charging control can be shortened.

EXPLANATION OF REFERENCE SIGNS 1 charger
2 battery accommodating unit
3 high-potential power supply line
4 low-potential power supply line
5 connection switching circuit
6 charging switch
7 control device
BAT battery
T1 to T2 first to second contacts
T(+), T(−) power input terminals

The invention claimed is:

1. A charger comprising:
 a battery accommodating unit including a first contact and a second contact configured to be respectively in contact with electrode terminals of a battery accommodated therein;
 a high-potential power supply line and a low-potential power supply line to which power for charging the battery is supplied;
 a connection switching circuit capable of switching between a first connection state in which the first contact is connected to the high-potential power supply line and the second contact is connected to the low-potential power supply line and a second connection state in which the second contact is connected to the high-potential power supply line and the first contact is connected to the low-potential power supply line; and
 a control device for controlling the connection switching circuit to acquire a battery voltage of the battery and perform charging control on the battery,
 wherein the control device performs pre-charging on the battery in the first connection state, and when the battery voltage does not exceed a predetermined set voltage, the control device switches the first connection state to the second connection state and performs the pre-charging on the battery, but when the battery voltage exceeds the set voltage, the control device performs normal charging on the battery.

2. The charger according to claim 1, wherein the control device stops charging when the battery voltage of the battery which has been subjected to the pre-charging does not exceed the set voltage in both the first connection state and the second connection state.

3. The charger according to claim 1, wherein the control device starts the normal charging when the battery voltage exceeds the set voltage in a period of time from start of the pre-charging until elapse of a predetermined time.

4. The charger according to claim 1, wherein the control device performs the normal charging without performing the pre-charging when an absolute value of the battery voltage has already exceeded the set voltage before the pre-charging is started.

5. A charging method comprising:
 a first connecting step of controlling a charger to be in a first connection state in which a first contact, among the first contact and a second contact configured to be respectively in contact with electrode terminals of a battery, is connected to a high-potential power supply line and the second contact is connected to a low-potential power supply line;
 a first pre-charging step of performing pre-charging on the battery in the first connection state;
 a second connecting step of switching the charger from the first connection state to a second connection state in which the second contact is connected to the high-potential power supply line and the first contact is connected to the low-potential power supply line when a battery voltage of the battery does not exceed a predetermined set voltage in the first pre-charging step;
 a second pre-charging step of performing the pre-charging on the battery in the second connection state; and
 a normal charging step of performing normal charging on the battery when the battery voltage exceeds the set voltage in the pre-charging on the battery.

6. The charging method according to claim 5, wherein charging is stopped when the battery voltage of the battery which has been subjected to the pre-charging does not exceed the set voltage in both the first connection state and the second connection state.

7. The charging method according to claim 5, wherein the normal charging is started when the battery voltage exceeds the set voltage in a period of time from start of the pre-charging until elapse of a predetermined time.

8. The charging method according to claim 5, wherein the normal charging is performed without performing the pre-charging when an absolute value of the battery voltage has already exceeded the set voltage before the pre-charging is started.

* * * * *